(12) United States Patent
Quackenbush et al.

(10) Patent No.: US 7,431,345 B2
(45) Date of Patent: Oct. 7, 2008

(54) SERVICEABLE EXHAUST JOINT CONNECTION

(75) Inventors: James Dale Quackenbush, Columbus, IN (US); Michael David Johnson, Columbus, IN (US)

(73) Assignee: EMCON Technologies, LLC, Wilmington, DE (US)

( * ) Notice: Subject to any disclaimer, the term of this patent is extended or adjusted under 35 U.S.C. 154(b) by 162 days.

(21) Appl. No.: 11/099,359

(22) Filed: Apr. 5, 2005

(65) Prior Publication Data

US 2006/0220384 A1 Oct. 5, 2006

(51) Int. Cl.
*F16L 27/04* (2006.01)

(52) U.S. Cl. .................................. 285/261; 285/263

(58) Field of Classification Search .................. 285/261, 285/51, 223, 234, 272, 376, 224, 263
See application file for complete search history.

(56) References Cited

U.S. PATENT DOCUMENTS

| | | | | |
|---|---|---|---|---|
| 188,213 A | * | 3/1877 | Weiss | 285/261 |
| 2,195,492 A | * | 4/1940 | McDonald | 285/330 |
| 2,417,250 A | * | 3/1947 | Harvey | 285/145.3 |
| 2,443,272 A | * | 6/1948 | Sagen | 285/146.3 |
| 2,475,834 A | * | 7/1949 | Harvey | 285/271 |
| 2,523,928 A | * | 9/1950 | Szekely | 285/330 |
| 2,556,659 A | * | 6/1951 | Patterson | 285/145.3 |
| 2,809,057 A | * | 10/1957 | McEachern | 285/187 |
| 3,695,654 A | * | 10/1972 | Meyer | 411/448 |
| 3,907,341 A | * | 9/1975 | Schoepe | 285/236 |
| 4,407,050 A | * | 10/1983 | Offterdinger | 24/277 |
| 4,708,377 A | * | 11/1987 | Hunting | 285/407 |
| 4,856,822 A | * | 8/1989 | Parker | 285/62 |
| 5,269,572 A | * | 12/1993 | Mefferd | 285/330 |
| 5,782,499 A | * | 7/1998 | Gfrerer et al. | 285/23 |
| 6,164,067 A | * | 12/2000 | Cronje | 60/322 |

* cited by examiner

*Primary Examiner*—James M Hewitt
(74) *Attorney, Agent, or Firm*—Carlson, Gaskey & Olds, PC

(57) ABSTRACT

An exhaust assembly includes a first pipe with a ball portion and a second pipe with a flare portion that is positioned in an overlapping relationship with the ball portion. The ball portion and flare portion are slidable relative to each other to allow alignment adjustment between the first and second pipes. A connector assembly includes a first connector member supported by the first pipe, a second connector member supported by the second pipe, and a clamp member that is used to serviceably connect the first and second pipes together. The first connector member includes a first plurality of fingers that are alternated with a second plurality of fingers on the second connector member. The clamp member is received within a groove formed about an outer circumference of the first and second connector members when the first and second pluralities of fingers are aligned with each other. The clamp member is easily removed for service operations as needed.

20 Claims, 2 Drawing Sheets

SERVICEABLE EXHAUST JOINT CONNECTION

TECHNICAL FIELD

The subject invention relates to an exhaust connection assembly including connector members supported on mating exhaust components that provide alignment adjustment, serviceability, and a secure connection interface.

BACKGROUND OF THE INVENTION

Exhaust components, such as pipes, for example, are connected to each other at various locations throughout a vehicle exhaust system. One example of a traditional connection between two mating pipes is a "slip joint" configuration. In this type of configuration, pipe portions are overlapped with one another and are clamped together with a clamp member. The clamp member acts directly against the pipe portions and deforms the pipe portions as a clamping load is applied.

One disadvantage with this connection method is that once the pipe portions are deformed, service operations cannot be performed on any of the exhaust components. Also, clamping forces can decrease over time, which when combined with deformed pipe portions, can loosen connection interfaces between mating components resulting in exhaust leaks, poor exhaust system performance, and increased noise.

Another traditional connection between two mating pipes utilizes a bolted joint configuration. In this configuration, each pipe is provided with a flat flange portion. The flat flange portions are aligned with each other and are fastened together. One disadvantage with this connection method is that there is no provision for alignment adjustment between the two mating pipes.

Thus, there is a need for a connector assembly for exhaust components that provides alignment adjustment, serviceability, and a secure connection interface, as well as overcoming the other deficiencies with prior designs described above.

SUMMARY OF THE INVENTION

A connector assembly that connects first and second exhaust components to each other provides serviceability, selective alignment adjustment to any one of various desired alignment positions, and a secure connection interface between the first and second exhaust components. The connector assembly includes a first connector member supported on the first exhaust component and a second connector member supported on the second exhaust component. The first and second connector members are clamped against the first and second exhaust components with a clamp member to securely connect the first and second exhaust components to each other.

In one example, the first and second exhaust components comprise first and second exhaust pipes. One of the first and second exhaust pipes includes a ball portion at a connection end and the other of the first and second exhaust pipes includes a flare portion at a connection end. The ball portion and the flare portion are positioned in an overlapping relationship to each other at a sliding interface. The ball portion and flare portion slide relative to one another to provide infinite alignment adjustment between the first and second exhaust pipes as needed.

The first connector member includes a first plurality of fingers and the second connector member includes a second plurality of fingers that are interspersed between the first plurality of fingers in an alternating pattern. The first and second pluralities of fingers cooperate to form a grooved recess about an outer circumference of the first and second connector members.

The clamp member is received within the grooved recess. The clamp member is clamped against the first and second pluralities of fingers to connect the first and second exhaust pipes to each other without deforming the connection ends of the first and second exhaust pipes. This provides a serviceable connection interface where the clamp member can be removed, and the first and second exhaust pipes can be separated from each other, to provide maintenance operations as needed.

The subject invention provides a connector assembly for connecting mating exhaust components together that provides serviceability, alignment adjustment, and a secure connection interface. These and other features of the present invention can be best understood from the following specification and drawings, the following of which is a brief description.

DETAILED DESCRIPTION OF THE PREFERRED EMBODIMENT

Figure 1:
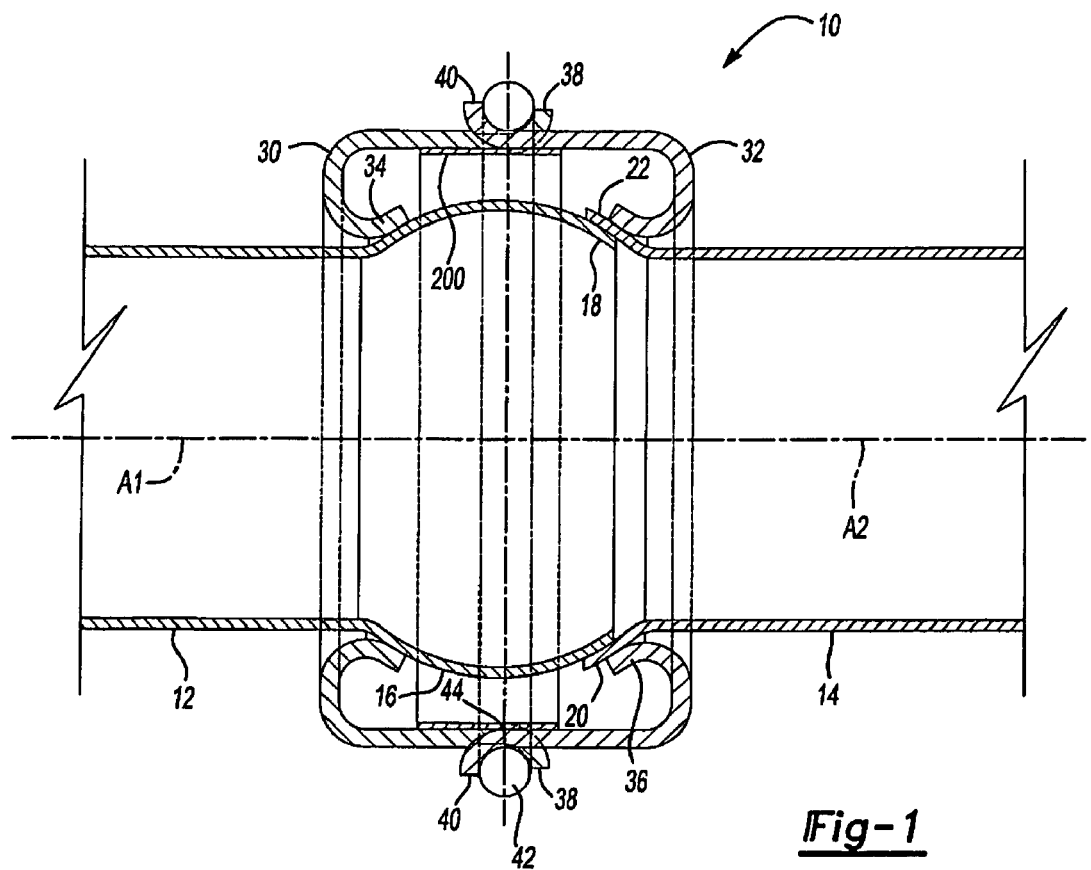
FIG. 1 is a cross-sectional view of a connector assembly designed according to the subject invention.

A connector assembly 10 for connecting a mating pair of exhaust components is shown in FIG. 1. In the example shown, the mating pair of exhaust components comprises a first exhaust pipe 12 and a second exhaust pipe 14. The first exhaust pipe 12 includes a ball portion 16 at one pipe connection end 18 and the second exhaust pipe 14 includes a flare portion 20 at one pipe connection end 22. The ball portion 16 and the flare portion 20 are positioned in an overlapping relationship to each other to provide a sliding interface.

It should be understood that while the first exhaust pipe 12 is shown with the ball portion 16 and the second exhaust pipe 14 is shown with the flare portion 20, a reverse configuration could also be used with the ball portion 16 being formed on the second exhaust pipe 14 and the flare portion 20 being formed on the first exhaust pipe 12. Also, the flare portion 20 is shown as being positioned radially outward of the ball portion 16, it should be understood that the ball portion 16 could be positioned radially outward of the flare portion 20.

When connected, the first 12 and second 14 exhaust pipes each define a central axis A1, A2. The sliding interface between the ball portion 16 and flare portion 20 provides alignment adjustment between the first 12 and second 14 exhaust pipes. Any one of multiple adjustment positions can be achieved by adjusting positions of the ball portion 16 and flare portion 20. By sliding the ball portion 16 and flare portion 20 relative to each other, an alignment position can be achieved where the central axes A1 and A2 are collinear with each other.

The connector assembly 10 includes a first connector member 30 that is supported on the first exhaust pipe 12 and a second connector member 32 that is supported on the second exhaust pipe 14. The first connector member 30 includes a first main body portion 34 that directly engages the ball portion 16 of the first exhaust pipe 12. The first main body portion 34 includes an inner circumferential area that completely surrounds the first exhaust pipe 12. The second connector member 32 includes a second main body portion 36 that directly engages the flare portion 20 of the second exhaust pipe 14. The second main body portion 36 includes an inner circumferential area that completely surrounds the second exhaust pipe 14. A thin sleeve 200 is attached to one of members 30 or 32 and assists in alignment.

The first connector member 30 includes a first plurality of fingers 38 that extend outwardly from the first main body portion 34. The first plurality of fingers 38 are circumferentially spaced apart from each other about an outer circumference of the first main body portion 34. The second connector member 32 includes a second plurality of fingers 40 that extend outwardly from the second main body portion 36. The second plurality of fingers 40 are circumferentially spaced apart from each other about an outer circumference of the second main body portion 36.

The first and second pluralities of fingers 38, 40 are aligned with each other in an alternating pattern. Preferably, one finger from the first plurality of fingers 38 is positioned directly between two fingers from the second plurality of fingers 40, and one finger from the second plurality of fingers 40 is positioned between two fingers from the first plurality of fingers 38. However, other alternating patterns could also be used.

A clamp member 42 is used to clamp the first 30 and second 32 connector members against the first 12 and second 14 exhaust components. The clamp member 42 cooperates with the first 38 and second 40 pluralities of fingers to connect the first 12 and second 14 exhaust pipes together. When the first 38 and second 40 pluralities of fingers are aligned with one another, a groove or recess 44 is formed about an outer circumference of the first 30 and second 32 connector members. The clamp member 42 is received within this recess 44.

The clamp member 42 is schematically shown in FIG. 1 as a U-bolt, however, other clamp members such as a spacer band, for example, could also be used. The clamp member 42 is clamped against the first 30 and second 32 connector members with a clamping force that is high enough to securely connect the first 12 and second 14 exhaust pipes together. However, this clamping force need not deform the first 12 and second 14 exhaust pipes during clamping. In other words, the pipe connection ends 18, 22 of the first 12 and second 14 exhaust pipes may continue to have their original shapes and profiles after clamping. Thus, the clamp member 42 can be removed and the first 12 and second 14 exhaust pipes can be easily separated from each other to perform service or maintenance operations as needed. That is, any deformation is minimal such that the first 12 and second 14 exhaust pipes can be individually replaced.

Figure 2:
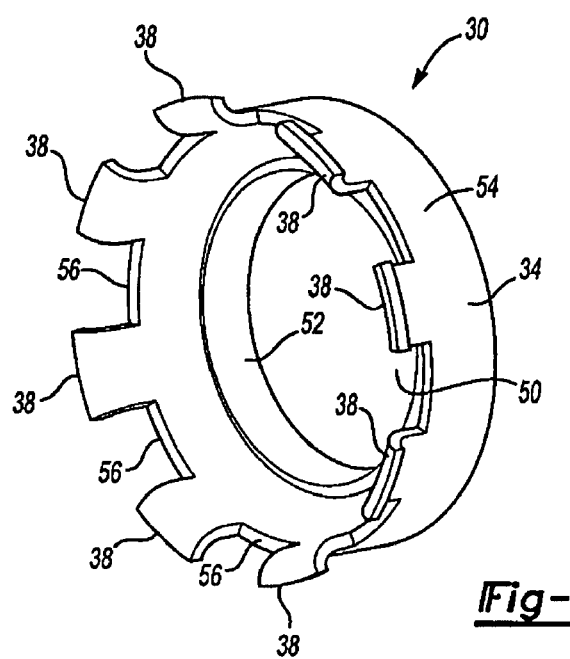
FIG. 2 is a perspective view of one connector member from the connector assembly of FIG. 1.
Figure 3:
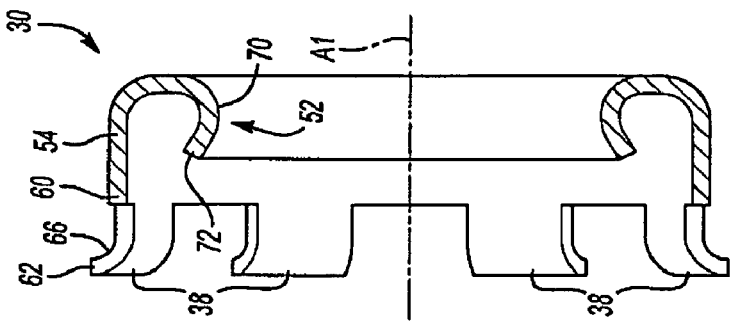
FIG. 3 is a cross-sectional view of the connector member of FIG. 2.

An example of the first connector member 30 is shown in FIGS. 2 and 3. It should be understood that the second connector member 32 would have a similar configuration of that shown for the first connector member 30. As discussed above, the first connector member 30 includes a first main body portion 34 and a first plurality of fingers 38. The first main body portion 34 is generally ring-shaped with a central opening 50 that receives the pipe connection end 18 of the first exhaust pipe 12.

An inner circumferential portion 52 defines an inner diameter surface that directly abuts against the ball portion 16. An outer circumferential portion 54 defines a band portion from which the first plurality of fingers 38 extends. Each finger from the first plurality of fingers 38 is spaced apart from an adjacent finger by a recess 56. One finger from the second plurality of fingers 40 is received within this recess 56. Each finger from the first plurality of fingers 38 is circumferentially spaced apart from each other about the central axis A1 of the first exhaust pipe 12.

As shown in FIG. 3, each finger of the first plurality of fingers 38 includes a base finger portion 60 that extends in a direction generally parallel to the central axis A1. Each finger of the first plurality of fingers 38 also includes a flared distal tip 62 that extends outwardly in a direction transverse to the central axis A1. Preferably, each finger includes a curved transitional surface 66 extending between the base finger portion 60 and the flared distal tip 62, which facilitates receiving and positioning of the clamp member 42.

In the example embodiment shown in FIG. 3, the inner circumferential portion 52 includes a curved surface 70 that abuts against the ball portion 16. The curved surface 70 extends inwardly toward the central axis A1 and then extends to a flared portion 72 that extends away from the central axis A1. The curved surface 70 also extends inwardly in a direction towards the first plurality of fingers 38.

Figure 4:
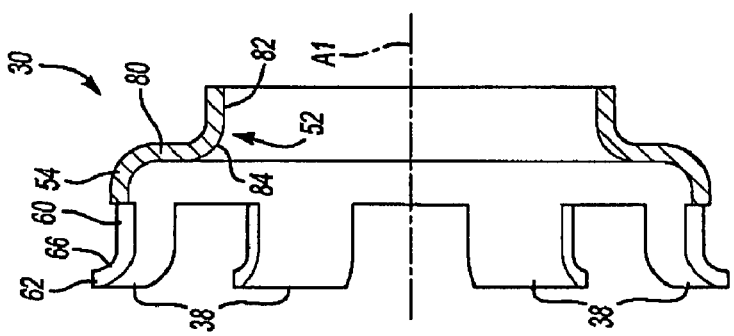
FIG. 4 is a cross-sectional view of another embodiment of a connector member.

The embodiment shown in FIG. 4 is similar to that of FIG. 3 but includes a different inner circumferential portion profile. In this example, the first connector member 30 includes an inwardly extending vertical wall portion 80 that extends from the outer circumferential portion 54 toward the central axis A1, and includes a horizontal wall portion 82 that extends from the vertical wall portion 80 in a direction along the central axis A1. The horizontal wall portion 82 extends in a direction away from the first plurality of fingers 38.

Preferably, the inwardly extending vertical wall portion 80 is generally perpendicular to the central axis A1, and the horizontal wall portion 82 is generally parallel to the central axis A1. A curved surface portion 84 transitions from the inwardly extending vertical wall portion 80 to the horizontal wall portion 82.

Figure 5:
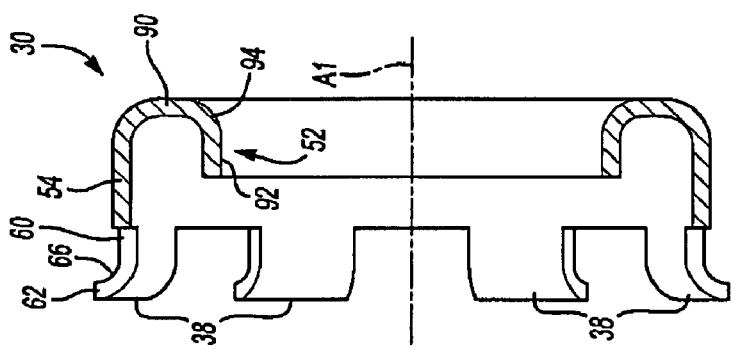
FIG. 5 is a cross-sectional view of another embodiment of a connector member.

The embodiment shown in FIG. 5 is similar to that of FIG. 4 but includes a different inner circumferential portion profile. In this example, the first connector member 30 includes an inwardly extending vertical wall portion 90 that extends from the outer circumferential portion 54 toward the central axis A1, and includes a horizontal wall portion 92 that extends from the vertical wall portion 90 in a direction along the central axis A1. The horizontal wall portion 92 extends in a direction toward the first plurality of fingers 38.

Preferably, the inwardly extending vertical wall portion 90 is generally perpendicular to the central axis A1, and the horizontal wall portion 92 is generally parallel to the central axis A1. A curved surface portion 94 transitions from the inwardly extending vertical wall portion 90 to the horizontal wall portion 92.

Figure 6:
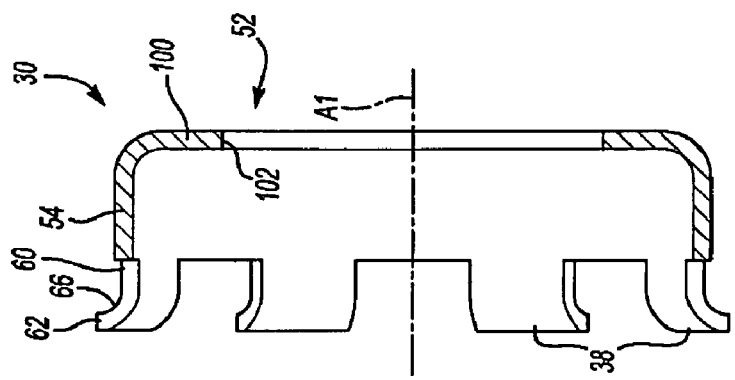
FIG. 6 is a cross-sectional view of another embodiment of a connector member.

The embodiment shown in FIG. 6 includes yet another different inner circumferential portion profile. In this example, the first connector member 30 includes an inwardly extending vertical wall portion 100 that extends from the outer circumferential portion 54 toward the central axis A1. The inwardly extending vertical wall portion 100 terminates at an inner peripheral edge 102 that abuts directly against the first exhaust pipe 12.

The subject invention provides a connector assembly 10 for connecting first 12 and second 14 exhaust pipes together in a secure, leak-free connection interface. The connector assembly 10 also provides serviceability and alignment adjustment.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An exhaust assembly comprising:
    a first connector member associated with a first exhaust component having a first curved surface, said first connector member including a first ring shaped body portion with a first connection interface wherein said first ring shaped body surrounds said first exhaust component;
    a second connector member associated with a second exhaust component having a second curved surface, said first and said second curved surfaces being positioned in an overlapping relationship to each other, and said second connector member including a second ring shaped body portion with a second connection interface interspersed with said first connection interface wherein said second ring shaped body surrounds said second exhaust component; and
    at least one clamp member cooperating with said first and said second connection interfaces to secure the first and the second exhaust components together.

2. The exhaust assembly according to claim 1 wherein said first connection interface comprises a first plurality of fingers and said second connection interface comprises a second plurality of fingers that extend between said first plurality of fingers in an alternating pattern.

3. The exhaust assembly according to claim 1 wherein said at least one clamp member comprises a U-bolt.

4. The exhaust assembly according to claim 1 wherein one of the first and the second exhaust components includes a ball portion forming a corresponding one of said first and second curved surfaces and the other of the first and the second exhaust components includes a flare portion forming a corresponding other of said first and second curved surfaces, with the ball portion and the flare portion being positioned in an overlapping relationship to each other to allow alignment adjustment between the first and the second exhaust components.

5. The exhaust assembly according to claim 1 wherein said at least one clamp member is selectively removable from said first and said second connector members for service operations.

6. The exhaust assembly according to claim 1 wherein said first and said second exhaust components each define an axis and wherein said first and said second ring shaped body portions comprise first and second bands having outer circumferential surfaces that surround said first and said second exhaust components, respectively, in a direction extending about said axis, and wherein said first and said second connection interfaces extend radially outwardly from one edge of said first and said second bands, respectively.

7. The exhaust assembly according to claim 1 wherein said first and said second connection interfaces cooperate with each other to form a curved recess that receives said at least one clamp member, said curved recess extending about an outer circumference of said first and said second connector members.

8. The exhaust assembly according to claim 1 wherein said first and said second exhaust components comprise first and second exhaust pipes, and wherein said first curved surface is immovable relative to said first exhaust pipe and said second curved surface is immovable relative to said second exhaust pipe, and with said first and said second curved surfaces being movable relative to each other for alignment purposes.

9. An exhaust assembly comprising:
    a first connector member associated with a first exhaust component having a first curved surface, said first Connector member including a first ring shaped body portion with a first connection interface that comprises a first plurality of fingers, and wherein said first ring shaped body portion surrounds the first exhaust component with said first plurality of fingers being circumferentially spaced apart from each other about said first ring shaped body portion;
    a second connector member associated with a second exhaust component having a second curved surface to overlap said first curved surface, said second connector member including a second ring shaped body portion with a second connection interface interspersed with said first connection interface, said second connection interface comprising a second plurality of fingers that extend between said first plurality of fingers in an alternating pattern, and wherein said second ring shaped body portion surrounds the second exhaust component with said second plurality of fingers being circumferentially spaced apart from each other about said second ring shaped body portion; and
    at least one clamp member cooperating with said first and said second connection interfaces to secure the first and the second exhaust components together.

10. The exhaust assembly according to claim 9 wherein each of said first plurality of fingers includes a first finger portion extending generally parallel to a first center axis defined by said first ring shaped body portion and a first flared distal tip portion extending outwardly from said first finger portion in a direction transverse to said first center axis and wherein each of said second plurality of fingers includes a second finger portion extending generally parallel to a second center axis defined by said second ring shaped body portion and a second flared distal tip portion extending outwardly from said second finger portion in a direction transverse to said second center axis, said first and said second finger portions being aligned with each other to form a recess between said first and said second flared distal tip portions.

11. The exhaust assembly according to claim 10 wherein said at least one clamp member is at least partially received within said recess.

12. An exhaust assembly comprising:
    a first exhaust pipe having a ball portion at one end;
    a second exhaust pipe having a flare portion at one end, said ball portion and said flare portion being positioned in an overlapping relationship to each other at a sliding interface to allow alignment adjustment between said first and said second exhaust pipes, and wherein said ball portion is immovable relative to said first exhaust pipe and said flare portion is immovable relative to said second exhaust pine, and with said ball portion and said flare portion being movable relative to each other for alignment purposes;
    a first connector member having a first ring shaped body including a first plurality of interlocking fingers, said first connector member being supported by said first exhaust pipe;
    a second connector member having a second ring shaped body including a second plurality of interlocking fingers positioned adjacent said first plurality of interlocking fingers, said second connector member being supported by said second exhaust pipe; and at least one clamp member that cooperates with said first and said second pluralities of interlocking fingers to secure said first and said second exhaust pipes together.

13. The exhaust assembly according to claim 12 wherein said first and said second pluralities of interlocking fingers are positioned in an alternating pattern relative to each other.

14. The exhaust, assembly according to claim 13 wherein one finger of said first plurality of interlocking fingers is positioned directly between two fingers of said second plurality of interlocking fingers and wherein one finger of said second plurality of interlocking fingers is positioned directly between two fingers of said first plurality of interlocking fingers.

15. The exhaust assembly according to claim 13 wherein each finger of said first and said second pluralities of interlocking fingers includes a flared distal tip such that a groove is formed about an outer circumference of said first and said second connector members when said first and said second pluralities of interlocking fingers are aligned with each other, and wherein said at least one clamp member is received within said groove.

16. The exhaust assembly according to claim 15 wherein said at least one clamp member comprises a U-bolt.

17. The exhaust assembly according to claim 12 wherein said first and said second exhaust pipes define a common axis and wherein said first and said second ring shaped bodies comprise first and second bands that surround said first and said second exhaust pipes, respectively, in a direction extending about said axis, and wherein said first and said second plurality of interlocking fingers extend radially outwardly from one edge of said first and said second bands, respectively.

18. The exhaust assembly according to claim 12 wherein said first and said second plurality of interlocking fingers cooperate to form a curved recess that receives said at least one clamp member, said curved recess extending about an outer circumference of said first and said second connector members.

19. The exhaust assembly according to claim 12 wherein said first ring shaped body surrounds said first exhaust pipe and said second ring shaped body surrounds said second exhaust pipe.

20. An exhaust assembly comprising:

a first exhaust pipe having a ball portion at one end;

a second exhaust pipe having a flare portion at one end, said ball portion and said flare portion being positioned in an overlapping relationship to each other at a sliding interface to allow alignment adjustment between said first and said second exhaust pipes;

a first connector member including a first plurality of interlocking fingers, said first connector member being supported by said first exhaust pipe, wherein said first connector member comprises a first ring shaped body having a first inner circumferential portion and a first outer circumferential portion, said first inner circumferential portion directly engaging said ball portion with said first plurality of interlocking fingers extending outwardly from said first outer circumferential portion;

a second connector member including a second plurality of interlocking fingers positioned adjacent said first plurality of interlocking fingers, said second connector member being supported by said second exhaust pipe, and wherein said second connector member comprises a second ring shaped body having a second inner circumferential portion and a second outer circumferential portion, said second inner circumferential portion directly engaging said flare portion with said second plurality of interlocking fingers extending outwardly from said second outer circumferential portion, and wherein said first and said second pluralities of interlocking fingers are positioned in an alternating pattern relative to each other; and at least one clamp member that cooperates with said first and said second pluralities of interlocking fingers to secure said first and said second exhaust pipes together, and wherein each finger of said first and said second pluralities of interlocking fingers includes a flared distal tip such that a groove is formed about an outer circumference of said first and said second connector members when said first and said second pluralities of interlocking fingers are aligned with each other, and wherein said at least one clamp member is received within said groove.

* * * * *